(12) United States Patent
Faith et al.

(10) Patent No.: US 8,534,550 B2
(45) Date of Patent: Sep. 17, 2013

(54) OBSERVABLE MOMENT ENCRYPTION

(75) Inventors: Patrick Faith, Pleasanton, CA (US); Mark Carlson, Half Moon Bay, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 13/443,475

(22) Filed: Apr. 10, 2012

(65) Prior Publication Data

US 2012/0198518 A1    Aug. 2, 2012

Related U.S. Application Data

(62) Division of application No. 12/428,712, filed on Apr. 23, 2009, now Pat. No. 8,177,135.

(51) Int. Cl.
*G06K 5/00*    (2006.01)

(52) U.S. Cl.
USPC .......................................... 235/382; 235/380

(58) Field of Classification Search
USPC ............. 235/472.01, 375, 380, 382; 713/168
See application file for complete search history.

(56) References Cited

U.S. PATENT DOCUMENTS

2001/0056409 A1   12/2001   Bellovin et al.
2007/0262138 A1   11/2007   Somers et al.

FOREIGN PATENT DOCUMENTS

JP    2003-223598    8/2003

OTHER PUBLICATIONS

The International Search Report for Application No. PCT/US2010/031669, dated Nov. 30, 2010, 5 pages.
The International Written Opinion for Application No. PCT/US2010/031669, dated Nov. 30, 2010, 4 pages.

*Primary Examiner* — Jamara Franklin
(74) *Attorney, Agent, or Firm* — Kilpatrick Townsend & Stockton LLP

(57) ABSTRACT

A method for authenticating a portable consumer device is disclosed. The method comprises receiving the first set of authentication data from the portable consumer device, the portable consumer device comprising a sensor configured to observe one or more events, a memory comprising a first set of authentication data, an alteration module with instructions for altering the first set of authentication data and a processor configured to execute the instructions for altering the first set of authentication data when the sensor observes the one or more events. The method further comprises comparing the first set of authentication data with a second set of authentication data, determining if the first set of authentication data complies with an expected change in authentication data from the second set of authentication data and sending an authentication response accordingly.

6 Claims, 10 Drawing Sheets

300

335{ $n_1\%$ $n_2\%$ $n_3\%$ $n_4\%$ $n_5\%$ $n_6\%$ $n_7\%$ $n_8\%$

OBSERVABLE MOMENT ENCRYPTION

CROSS-REFERENCE TO RELATED APPLICATIONS

This application is a divisional application of U.S. patent application Ser. No. 12/428,712, filed Apr. 23, 2009 now U.S. Pat. No. 8,177,135, entitled "Observable Moment Encryption," which is hereby incorporated by reference, as if set forth in full in this document, for all purposes.

BACKGROUND

As usage of electronic authorizations increase, problems such as fraud continue to persist. One way to reduce fraud in electronic authorizations is to authenticate the identification device, or other portable consumer device, used in the electronic authorizations. Another way to reduce fraud in electronic authorizations is to encrypt identification information that is stored, sent or received during the electronic authorization process so any information that might be intercepted during the authorization process cannot be used by unauthorized entities.

FIG. 1 depicts a conventional credit card. Credit card 100 comprises various identification or authentication information such as name 130, credit card account number 110 and anti-counterfeiting feature 120. Typically name 130, is the name of the credit card account holder. Credit card account number 110 is usually an account number associated with a credit card account and the credit card 100. Anti-counterfeiting feature 120 can be one or more of a number of features. For example, anti counterfeiting feature 120 can be a holographic image of a company logo, emblem or name.

Conventionally, anti-counterfeiting feature 120 is any type of feature that is difficult, expensive or complicated to reproduce. However, physical anti-counterfeiting feature 120 can do little to inhibit electronic or non-face-to-face authorization fraud. If an unauthorized user obtains credit card account number 110, he or she can use it to make credit card purchases over the Internet or over the telephone. As long as the unauthorized user has the correct account number, expiration date and possibly a CVV, the unauthorized user can make many unauthorized purchases before the fraudulent activity is detected. Most, if not all, information necessary to make remote fraudulent purchases is usually readily available to anyone who views the card. The identification information seen on the front of credit card 100, is typically also contained in a computer readable medium not shown in FIG. 1.

As with any electronic transaction, there is always a chance that information contained in the authorization request message used in an electronic authorization can potentially be intercepted while it is being electronically transmitted. During an electronic authorization, an authentication request message comprising identification information and other information is transmitted to a remote server. While the authentication request message is being transmitted, the identification information is subject to theft by electronic means. In an attempt to thwart such theft, many companies have resorted to encrypting identification information printed on or contained in the electronic media of credit card 100 as it is transmitted electronically to the remote authentication server. Such measures afford credit card companies a certain degree of confidence that the credit card numbers they receive are indeed valid consumer credit card account numbers submitted by authorized consumers. However, the more the consumer credit card account number is transmitted; the chance that the information is intercepted during transmission increases. Likewise, the more the credit card number is used, the chance of an unauthorized user breaking the encryption code increases.

FIG. 2 depicts an encryption methodology. Account number 210 is the account number printed or encoded on a credit card. However, account number 210 is not the actual account number associated with the consumer credit account. Rather, account number 220 is the actual account number associated with the consumer credit account. Digits 230 are encrypted. Digits 230 in account number 210 are converted from those shown to the digits shown in digits 230 in account number 220. The conversion involves an encryption that requires an encryption key. Anyone with the encryption key can convert digits 230 between the encrypted account number 210 and the unencrypted in account number 220. As previously mentioned, the more the consumer account number is used and transmitted for authorization the more likely it becomes that an unauthorized user will intercept and decrypt the consumer account number.

It is therefore clear that improvements to encryption technology to reduce the chance of account number 210 from being decrypted and used by an unauthorized user are desirable. Embodiments of the disclosure address the above problems, and other problems, individually and collectively.

BRIEF SUMMARY

Systems, apparatuses and methods for encrypting data are disclosed. More specifically, embodiments of the invention relate to methods, systems and apparatuses for gradually changing a consumer authentication or identification number each time an observable moment is observed. The gradually changing consumer authentication or identification number can be analyzed to determine if it complies with a stored known pattern of change or usage history, which can then be used to authenticate portable consumer devices used in authentication transactions.

In one embodiment of the present invention, a portable consumer device comprises a sensor configured to observe one or more events, a memory comprising authentication data, an alteration module with instructions for altering the authentication data and a processor configured to execute the instructions to alter the authentication data when the sensor observes the one or more events.

In another embodiment of the present invention, a method for using a portable consumer device comprising a sensor configured to observe one or more events, a memory comprising authentication data, an alteration module with instructions for altering the authentication data and a processor configured to execute the instructions for altering the authentication data that is triggered when the sensor observes the one or more events, is disclosed. The method comprises exposing the portable consumer device to one or more events that trigger altering the authentication data to create an altered authentication data, presenting the portable consumer device to an authentication requestor, and sending the altered authentication data to an authentication server. The authentication server receives the altered authentication data and analyzes it to make a determination whether the altered authentication data is consistent with an expected pattern of alteration and then sends an authentication response based on the determination.

In yet another embodiment of the present invention, a method for authenticating a portable consumer device comprising a sensor configured to observe one or more events, a memory comprising a first set of authentication data, an alteration module with instructions for altering the first set of authentication data and a processor configured to execute the instructions for altering the first set of authentication data when the sensor observes the one or more events is disclosed. The method comprises receiving the first set of authentication data from the portable consumer device and comparing the first set of authentication data from the portable consumer device with a second set of authentication data. The server then determines if the first set of authentication data from the portable consumer device complies with an expected change in authentication data from the second set of authentication data and then sends an authentication response based on whether the first set of authentication data complies with the expected change in authentication data from the second set of authentication data.

DETAILED DESCRIPTION

Figure 1:
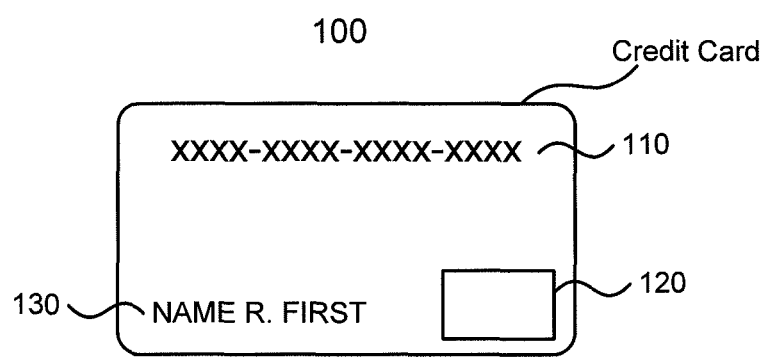
FIG. 1 depicts a front view of a credit card.
Figure 2:
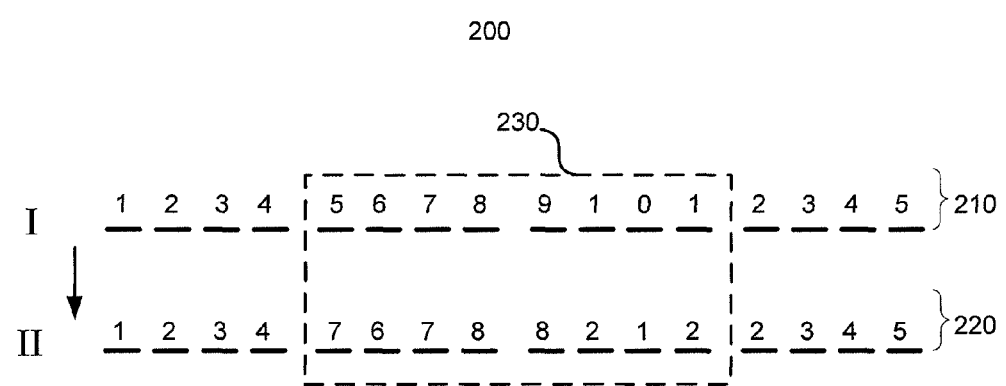
FIG. 2 depicts one scheme for encrypting a consumer identification number found.
Figure 3A:
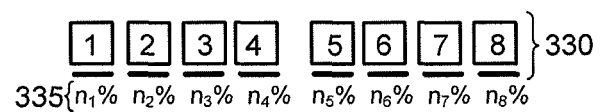
FIG. 3A depicts an overview of a scheme for encrypting a consumer identification number according to one embodiment of the present invention.
Figure 3B:
FIG. 3B depicts an overview of a scheme in which a consumer identification number gradually drifts over time for encrypting a consumer identification number according to one embodiment of the present invention.
Figure 3B:
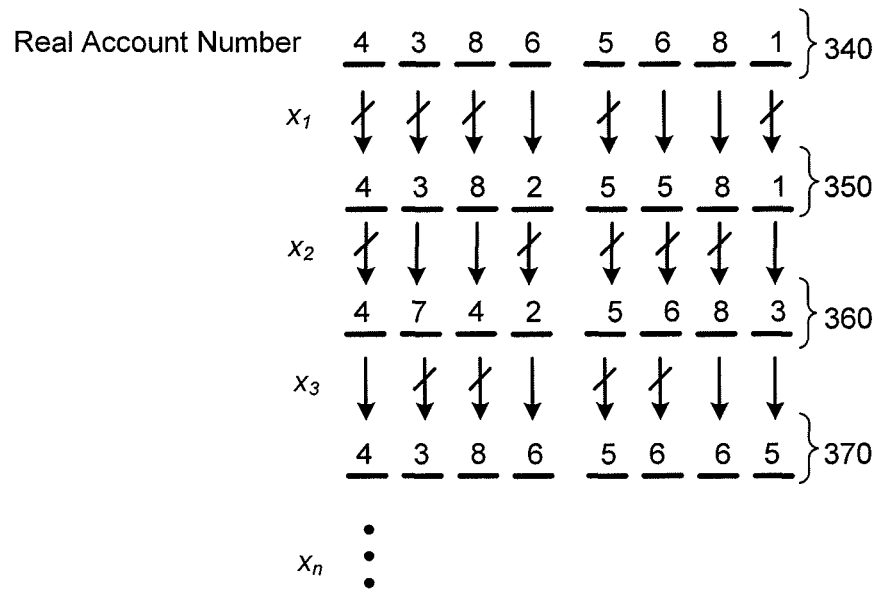

FIGS. 3A and 3B depict a method 300 for tracking a consumer account or identification number based on gradually changing the consumer account or identification number when one or more observable events or moments are observed according to one embodiment of the present invention. For purposes of illustration, method 300 is illustrated with a consumer identification number 330 with digits 1 through 8. However, it is contemplated that embodiments of the invention can be used to encrypt or track consumer account or identification numbers of any length.

As used herein, the terms observable moments and observable events can be used interchangeably. In various embodiments, observable events are detected by a sensor on a portable consumer device. The type of sensor used, of course, will be dictated by the type of observable events that the issuer of a portable consumer device wants to have trigger a drift in the consumer account or identification number. As used herein, the term consumer account number can be used interchangeably with consumer identification number or data or consumer authentication number or data. Any of the aforementioned terms can be associated with a particular consumer, a particular portable consumer device or particular consumer account.

Each digit 1 through 8 of the consumer account number 330 has an n % chance 335 of being changed each time an observable moment or event is observed. When the consumer account number changes gradually over time upon the observation of multiple observable events this is referred to herein as a drift in the consumer account number. Any alphanumeric or numeric string can be configured to drift according to the present invention. The number of digits that change upon observing an observable moment can vary. A person of ordinary skill in the art will recognized that strings of various lengths with various arrangements of digits that change can be utilized without deviating from the spirit and scope of the present invention. For example, according to one embodiment, alternating digits can be configured to change when an observable event occurs. Such embodiments can be configured by controlling the percentage chance that a particular digit will change. A percentage chance of 0% for a particular digit indicates that that digit will not change.

In various embodiments, percentage chances $n_1$% through $n_8$% will all be different. In various other embodiments, percentage chances $n_1$% through $n_8$% will all be the same. In yet other embodiments, some of percentage chances $n_1$% through $n_8$% are equal to one another. The higher the percentage chance of change for each digit, the faster the account or identification number will change as a function of the number of observable events observed. For example, if digit 1 has the percentage chance of changing of $n_1$%=0.1%, there is only a 1 in 1000 chance that digit 1 will change upon observing each observable event. In contrast, suppose digit 6 has $n_6$%=20%, or one in five, chance of changing each time an observable event is observed. As such, one would expect to see digit 6 change much more frequently than digit 1. Evidence to the contrary would indicate the possibility that a counterfeit or fraudulent account or identification number had been presented for authentication.

In various embodiments, the percentage chance of changing each digit in the account or identification number can be tailored to fit the expected usage patterns of the intended user. For example, if a user of a particular portable consumer device is expected to expose his or her particular portable consumer device to many observable events in a given day, then it is beneficial to set the percentage chance for the digits in his or her account number to a small value so that the account number does not change too rapidly over time. In various other embodiments, it may be desirable to use a higher percentage chance a digit will change. In this way a higher drift rate would occur.

In various embodiments, the observable moment or event can be a physical event. For example, an observable event can occur when a consumer exposes his or her portable consumer device to a change in environment. The change in environment can be a change in lighting conditions, temperature, elevation, motion, electromagnetic field or pressure.

FIG. 3B depicts an encryption scheme according to one embodiment of the present invention. Each digit 1 through 8 of consumer account number 330 has an associated percentage chance of changing whenever an observable event is observed as shown in FIG. 3A. The percentage chance that each digit will change can be hidden or encrypted on a portable consumer device to add an additional layer of security. In various embodiments, an initial or real account number 340 is assigned to an associated consumer account or an associated portable consumer device. In various embodiments, the link between the associated consumer account and the associated portable consumer device is only known to a back end server.

In various embodiments, real account number 340 can be encoded on a memory on a portable consumer device. At some time event $x_1$ is observed. Based on the percentage chances $n_1\%$ through $n_8\%$ for corresponding digits 1 through 8, each digit may or may not change. As can be seen in FIG. 3B, the change between real account number 340 and account number 350 only occurred in digits 4 and 7. Some time after event $x_1$ is observed, event $x_2$ is observed. Just as event $x_1$ triggered the change from real account number 340 to account number 350, event $x_2$ triggers a change from account number 350 to account number 360. As shown, only digits 2, 3 and 8 changed. Subsequently, event $x_3$ is observed and triggers a change from account number 360 to account number 370 in which digits 1, 4, 7 and 8 change. Such changes continue to occur each time an event x is observed. Ultimately, account number after n observable events results in account number 380.

Account numbers 340, 350, 360 and 370 all the way to account number 380 can potentially be presented to an authorization requestor when a consumer initiates an electronic authorization. In various embodiments, the drift of the account number upon the observation of observable events provides the robustness of the encryption method depicted in FIGS. 3A and 3B. In contrast to conventional encryption methods, which are potentially weakened each time a consumer account or identification number is used, the encryption method according to the present invention becomes more robust the more times the consumer account or identification number on a portable consumer device is used. For example, in conventional credit or debit cards, the consumer account number printed or encoded on the card may be the actual consumer account number or an encrypted version of the consumer account number. In either case, the consumer account number is usually sent to an authentication network for authorization in an encrypted form. Each time the encrypted consumer account number is sent is an opportunity for it to be intercepted by unauthorized users. If an unauthorized user obtains the encrypted consumer account number and somehow decrypts it, that unauthorized user will be able to use the consumer account number to make charges against the consumer account. Embodiments of the present invention solve this and other problems.

In various embodiments, the more a portable consumer device is used, the more difficult it is for an unauthorized user to intercept a useable or decipherable account number.

According to various embodiments of the present invention, it is the pattern of observable events, the pattern of drift of the consumer account number or the history of alterations to the consumer account number that provide the underlying basis for verifying the consumer account number. The drift of the consumer account number, as herein, can refer to the way the consumer account number changes over time. The history of alteration to the consumer account number can refer to the recorded specifics of the observable event that trigger each step of the drift in the consumer account number (i.e. time and place).

In various embodiments, an issuer may want to track whenever a portable consumer device is exposed to light. In such embodiments, a sensor on the portable consumer device will be photosensitive. Therefore, each time the consumer removes his or her portable consumer device from his or her wallet or purse under lit conditions, a processor on the portable consumer device will be triggered by the photosensitive sensor to execute one or more instructions for altering the account or authorization number contained in the portable consumer device. In other embodiments, the sensor on the portable consumer device will only trigger a change in the account or authorization numbers when is exposed to an observable moment for a predetermined duration. For example, in the photosensitive sensor example given above, the triggering events may occur when the photosensitive sensor counts z number of photons or is exposed to light for more than one minute. As such, the alteration of the consumer account number or identification number will only be triggered when the photo sensor detects x number of photons or is exposed for one minute, which may or may not be each time the portable consumer device is exposed to light. In such embodiments, the consumer account number or notification number will not necessarily change each time the portable consumer device is exposed to light.

In various embodiments, the portable consumer device is an radiofrequency identification card (RFID card) that contains an RFID tag. The RFID tag can be a passive or a powered device. RFID tags typically comprise an antenna and an integrated circuit that contains consumer account or identification data. An RFID tag will respond with the data stored in its integrated circuit when it is scanned with the proper radiofrequency signal. In embodiments in which the portable consumer device has an RFID tag, the RFID tag can be configured to observe each time the portable consumer device is exposed to a radiofrequency signal. As such, the observable moment occurs each time the portable consumer device is exposed to a radiofrequency signal that the RFID tag is configured to detect. It is not necessary for the radiofrequency signal to be the radiofrequency signal intended to be used to scan and receive data from the portable consumer device. For example, an RFID portable consumer device can be a payment card carried in the pocket of the authorized consumer. Each time the authorized consumer uses the portable consumer device at an RFID equipped access device or payment terminal, the portable consumer device observes the observable moment. In addition, each time the authorized consumer walks through an RFID radiofrequency equipped turnstile or RFID radiofrequency equipped access door, the RFID portable consumer device can observe those radiofrequency signals as well. In such embodiments, an alteration of the consumer account or identification number will occur each time the authorized consumer encounters an RFID radiofrequency signal.

In various embodiments, other information, such as time of day, can also be stored after each observed observable event. Other types of information and observable moments that can be stored to create user history or pattern include, but are not limited to, location of previous usage, time of previous usage, type of previous usage and amount of previous usage in the case of payment histories. This information can be used to develop a pattern or history for a particular portable consumer device. Additionally, each time a portable consumer device encounters a trusted or secure access device, such as a point-of-sale terminal of a known secure and trusted authentication requestor, the information regarding how and when the consumer account number or identification number has changed since the portable consumer device was last observed at a known secure and trusted authentication requestor can be recorded or uploaded to a server.

An example of a pattern or history of use when the portable consumer device is a credit card equipped with a photosensitive sensor and configured to change the credit card number each time the credit card is exposed to light is as follows. At 8:30 AM, every Monday morning, the holder of the credit card removes it from his wallet and uses it to purchase gasoline. At approximately 12 PM every weekday, that same holder of the credit card removes it from his wallet and uses it to pay for lunch. At 8 PM every Friday evening, the holder of the credit card removes it from his wallet and uses it to purchase movie tickets. In this example, the pattern includes not only the date and time information but can also include the location and type of transaction conducted just before or after the observable events.

According to the example above, the consumer credit account number contained on the credit card has, assuming the credit card is exposed to a lit environment, potentially observed seven observable events. In such a scenario, the credit card number drifted from its original account number each time the credit card was used according to the percentage chance of changing for each digit of account number. However, depending on how the credit card was handled and processed during each transaction, the credit card may have been exposed to more than one observable event at each transaction. For instance, at 8:30 AM every Monday morning, the holder of the credit card removes the credit card from his wallet; insert the credit card into the pay-at-the-pump credit card reader, and then removes the credit card from the pay-at-the-pump credit card reader replaces in his wallet. As just described, the credit card observed at least two observable events during such a transaction. The first observable event occurred when the credit card holder removed the credit card from his wallet. The second observable event occurred when the credit card holder removed the credit card from the pay-at-the-pump credit card reader. As such, the credit card number would have drifted two times during that one transaction. Accordingly, each transaction subsequent to the gasoline purchase on Monday morning will be conducted with the credit account number that has drifted at least two times.

Furthermore, it is possible for the consumer account number or notification number to drift without the credit card having been used in any transaction whatsoever. In various embodiments, this can occur if the holder of the credit card simply removes the credit card from his or her wallet or purse and exposes the credit card to light. For instance, the credit card may be exposed to light when the holder of the credit card uses the credit card solely as a secondary form of identification. Alternatively, the credit card could be carried without a wallet or purse. In such a scenario, the credit card may be exposed to light at dawn after a night of darkness before the holder of the credit card places credit card in his pocket, or when the holder of the credit card arrives at his place of work and places his belongings on his desk.

In various embodiments, a record or a graph of observed observable moments can be recorded. In such embodiments, authenticating a portable consumer device or an authorized user can include verifying an established pattern of observable moments that are unique to the authorized user of an authorized portable consumer device. For example, if authorized user A takes his credit card out of his wallet every Thursday at 4 PM to buy gasoline and puts his wallet in his pocket at 8 am every morning, a sensor in the card may sense light at 4 PM every Thursday but may not sense light starting at 8 am every morning for some typical period of time. This pattern of observable moments can be stored as an observable moment vs. time profile and can be used to authenticate authorized user A. The pattern of observable moments of authorized user A can be different than a pattern of observable moments of an unauthorized person who may expose an unauthorized portable consumer device to light in an effort to defraud the issuer and the authorized user of the authorized portable consumer device.

In various embodiments, data relating to the pattern of observable moments experienced by an authorized portable consumer device can be sent to an authentication server during each transaction conducted by the authorized portable consumer device. The authentication server can compare the received pattern of observable moments with past patterns of observable moments and can make a determination as to whether or not the received pattern of observable moments is expected or unexpected. If it is expected, then the portable consumer device can be considered authentic. If it is not expected, then the portable consumer device may be considered not authentic.

Other examples of an observable events not related to a particular transaction can include any use of the credit card independent of its intended use as a method of payment in which it is exposed to light. For example, such observable events may occur when the holder of the credit card uses the credit card for something other than its intended purpose (i.e. a straightedge or a scraper).

Although the foregoing examples all reference the exposure to light as the observable event, any event for which there is a suitable sensor can be used as the observable event. For example, the portable consumer device can be a mobile telephone that comprises a computer readable medium that contains consumer account or identification number. In such an embodiment, the observable events can be whenever the mobile telephone is used or at least some subset of the times the mobile telephone is used (i.e. to send an e-mail, send an SMS or an MMS message or make a telephone call, etc).

In various embodiments, the portable consumer device is a mobile telephone with a processor, and a memory. The availability of a processor and memory in a mobile telephone provides an opportunity to track even more detail about the usage pattern and history for a particular consumer or portable consumer device. For example, many mobile telephones today can accurately determine the geographic location of the mobile telephone based on triangulation from cell phone towers or GPS satellites. Therefore, in addition the time, destination address or telephone number and the length of the message or telephone call, a mobile telephone can store location of a particular observable moment. Such a pattern is best illustrated by an example.

In one embodiment, the portable consumer device is a mobile telephone and is configured to alter the stored consumer account number or identification number when it observes predetermined observable moments. The observable moments can include each time a mobile telephone is used to place a telephone call longer than one minute in duration. For instance, the holder of the mobile telephone uses the mobile telephone at 7 AM Monday through Friday to call his or her spouse for 5 to 10 minutes. Furthermore, the same holder of the mobile telephone also uses the mobile telephone to make a one hour call to his or her mother every Sunday night at 6 PM. In this example, not accounting for any incidental telephone calls made during the week, the mobile telephone observes at least six observable events per week. These six observable events per week translate into a drift of the consumer account number or identification number according to a specific scheme engineered to drift the particular account or identification number stored in the memory of the mobile telephone. The various schemas for how the consumer account or identification number can drift will be discussed more in reference to FIG. 5B.

Any time the consumer account or identification number stored in the mobile phone is presented for authentication, the consumer account or identification number should have drifted at least six times in the last week. When a consumer account or identification number is presented for authentication that does not appear to have drifted according to predetermined drift scheme at least six times in the last week, then the chances are relatively high that the consumer account or identification number is not authentic and is being provided by a fraudulent mobile phone or the authentic mobile telephone is being used by an unauthorized user. The level of fraud detection in such embodiments is based on the fact that is will be difficult for an unauthorized user to reproduce the usage pattern or history of the authorized user of the portable consumer device. It is unlikely that an unauthorized user will have the same usage as the authorized user. Any attempt to generate the drift pattern randomly can be thwarted by the addition of information external to the drift of identification number in various embodiments (i.e. the time, location, duration or type of observable moment). Furthermore, the manner in which the consumer identification number changes based on the percentage chance that any particular digit in the consumer identification number will change also makes it difficult for unauthorized users to merely guess or use a random number generator to happen upon a valid identification number.

In various embodiments, as in the one depicted in FIG. 3B an identification number contained in a portable consumer device configured to alter the identification number can eventually drift to the point that the resulting identification number does not resemble the initial identification number in any way. As can be seen real account number 340 looks nothing like the account number 380 after n observable moments and corresponding drift steps. When this happens, it is necessary to reset what is considered the initial identification number. That is, when an identification number has drifted so far away from the initial identification number it is taken as the new true identification number. This can occur when the portable consumer device is presented to a known secure and trusted access device.

In various embodiments, identification number can be synced with an authentication server whenever the portable consumer device is used in a known secure and trusted access device. In reference to the example above in which the portable consumer device is a mobile telephone, the known secure and trusted access device can be a cell tower near the consumer's home based on a previously stored address or cell tower designation. When the user of the mobile telephone uses her telephone in or around her home, the current consumer identification number can be uploaded to authentication server to be stored as the new initial consumer identification number against which future altered consumer identification numbers will be compared for appropriate drift patterns and usage history.

In various embodiments, certain authentication requestors or access devices can be designated as trusted entities. When a trusted entity receives a consumer identification number from a portable consumer device that is altered from the initial consumer identification number on file in a database, it will update the database so that the new altered consumer identification number is used as the new baseline or current consumer identification number in the history of consumer identification numbers. For example, a card reader on the authorized users on the computer can be a trusted entity from which the altered consumer identification number can be synced with the data in the database from which the authentication server pulls information when authenticating a particular portable consumer device. In other embodiments, the trusted entity can be a bank location at which personal identification and other verification information is checked by bank personnel before updating the baseline or current consumer identification number in the history of consumer identification numbers.

In various other embodiments, a consumer identification number can be stored as the new baseline or current consumer identification number in the history of consumer identification numbers if the consumer identification number submitted to an authentication network has drift to a point that is no longer resembles the original initial or baseline consumer account number. In other embodiments, the consumer identification number submitted to an authentication network is also analyzed using risk analysis protocols for additional validation.

Figure 4:
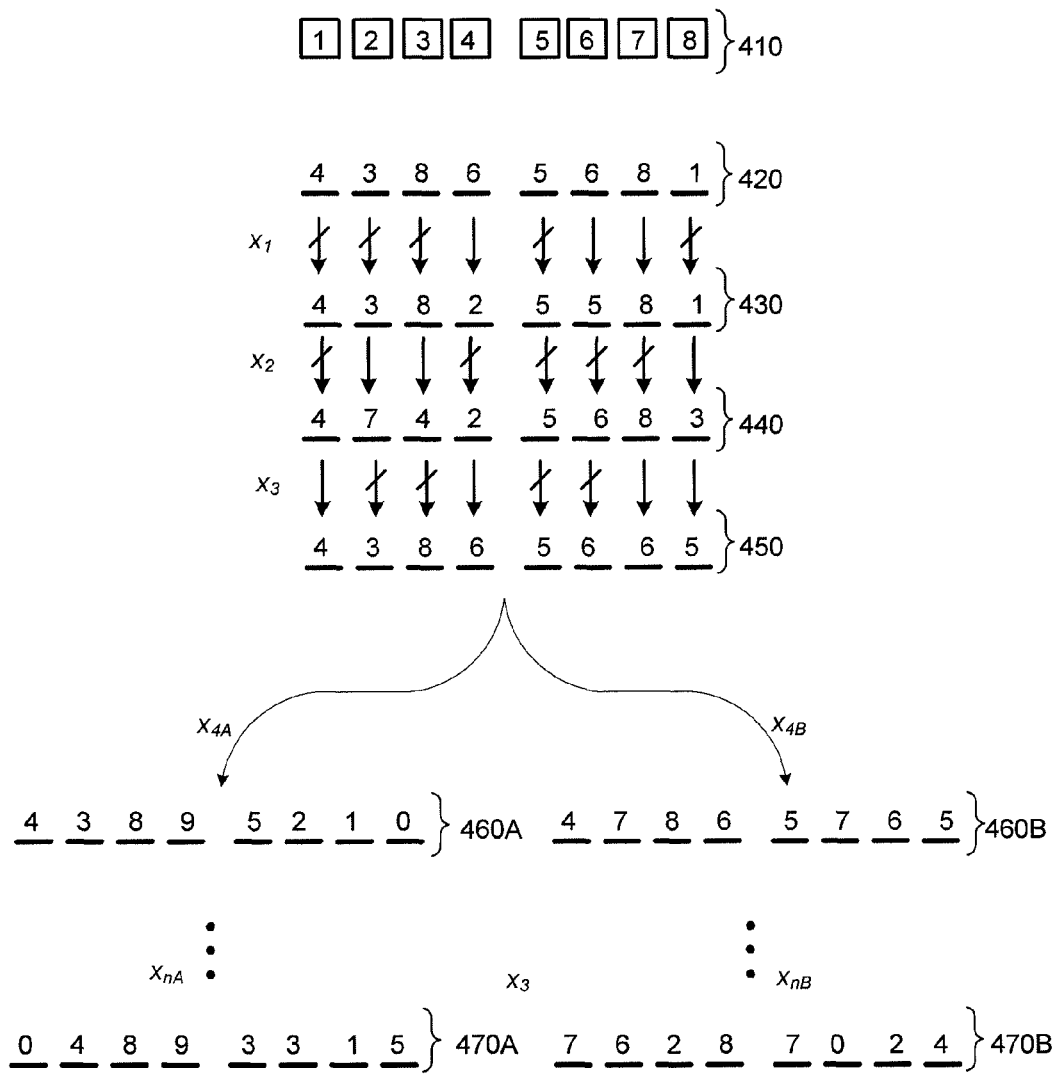
FIG. 4 depicts a scheme for detecting unauthorized use of a consumer identification number according to one embodiment of the present invention.

FIG. 4 depicts a scheme for gradually changing a consumer identification number and a scenario in which an unauthorized user tries to duplicate the consumer identification number or to use the authentic portable consumer device. In various embodiments, initial consumer identification number 410 has eight digits numbered 1 through 8. As discussed previously each digit has a corresponding n % chance of changing each time an observable event is observed. As shown in FIG. 4, initial consumer identification number 420 is changed when the portable consumer device containing initial consumer identification number 420 observes observable moment $x_1$. In this particular example, digits 4, 6 and 8 are changed and consumer identification number 430 now represents the current state of the consumer identification number stored in the portable consumer device. Later the portable consumer device observes observable moment $x_2$. After the observation of observable moment $x_2$, consumer identification number 430 is changed into consumer identification number 440 by changing digits 2, 3 and 8. When the portable consumer device observes yet another observable moment $x_3$, consumer identification number 440 is changed into consumer identification number 450 by changing digits 1, 4, 7 and 8. In this scenario, at a time after observable moment $x_3$, consumer identification number 450 is intercepted or otherwise stolen by an unauthorized user.

In an attempt to reproduce the gradually changing nature of the consumer identification number 450, the unauthorized user simulates or otherwise exposes a device configured to mimic the response of the authentic portable consumer device to observable events to change consumer identification number 450 in step $x_{4B}$ whereupon an unauthorized consumer identification number 460B is the result. Meanwhile the authorized user of consumer identification number 450 exposes the authorized portable consumer device to an observable moment $x_{4.4}$ that triggers a change from consumer identification number 450 to consumer identification number 460A.

After observable moment $x_3$, there are now two paths of change or patterns of drift in the digits of the two consumer identification numbers. One path, the authorized path, begins with consumer identification number 460A and continues to change each time the authorized portable consumer device observes an observable event. The other path, the unauthorized path, begins with consumer identification number 460B. The unauthorized path of consumer identification numbers will not have the correct percentage chance of changing 335 for each digit and it will not have the correct manner for changing each changed digit. In addition, the unauthorized path will not change according to the pattern or history of usage that has been established for the authorized user in the authorized path of change of the consumer identification number. It can be difficult, if not impossible, for the unauthorized path of consumer identification numbers to match the authorized path of consumer identification numbers.

In various embodiments, an authentication server will be able to run a consumer identification number authentication analysis based on whether the consumer identification number is consistent with the drift seen in previously submitted consumer identification numbers. In some embodiments, authentication comprises analyzing the rate and manner in which digits of the consumer identification number change against stored previously submitted consumer identification numbers and the known scheme implemented for the consumer identification number coming from a particular portable consumer device. For example, as described above, the typical use pattern of the holder of a particular portable consumer device could indicate the consumer identification number should change or drift approximately 6 to 7 times per week. If a consumer identification number is submitted that exhibits either no change or significantly more change than would normally be expected, then the authentication server can choose to deny the authorization request or submit the authorization request message to further authentication protocols.

In various embodiments, the authentication analysis can comprise analyzing the manner in which digits of consumer identification number change. For example, in addition to the percentage chance that a given digit will change upon the observation of an observable moment, the authentication server can also have access to the known scheme for changing a particular digit. Thus, it is known that if a digit is a 4, and that it would take 25 or more changes to make that 4 a 9, and within one or two days the consumer identification number becomes a 9, it would be highly likely that the consumer identification number is fraudulent. In various other embodiments, the manner in which individual digits of a consumer identification number change can be checked against the known protocols with which they are configured to change. An exemplary system for changing the digits of the consumer identification number is described below.

Figure 5A:
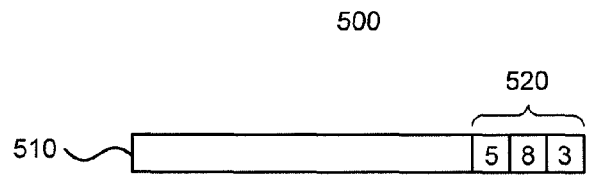
FIG. 5A depicts a three-digit dynamic card verification value according to one embodiment of the present invention.

FIG. 5A depicts consumer identification number 500 according to one embodiment of the present invention. Consumer identification number 500 comprises some number of base digits 510 and changeable digits 520. In various embodiments, changeable digits 520 can be dCVV digits. In various embodiments, base digits 510 can precede changeable digits 520 as shown in FIG. 5A. In various embodiments, base digits 510 can follow changeable digits 520. In yet other embodiments, changeable digits 520 can be inserted into base digits 510 in a contiguous configuration or changeable digits 520 can be interspersed into base digits 510.

Figure 5B:
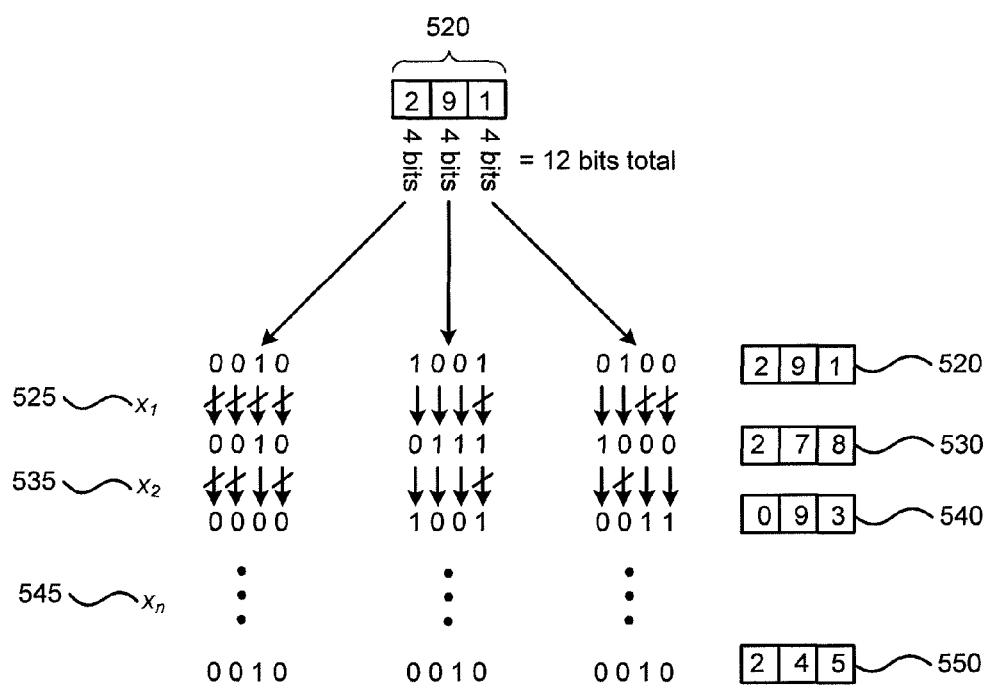
FIG. 5B depicts one scheme for altering a three-digit section of a consumer identification number in which each digit drifts at the bit level according to one embodiment of the present invention.

FIG. 5B depicts a scheme for altering changeable digits 520 according to one embodiment of the present invention. Each digit of changeable digits 520 comprises four bits. As shown, with three digits this means that there are 12 bits total. Each digit is treated as an individual binary number. In various embodiments of the present invention, changeable digits can comprise more or less than three digits and can therefore comprise more or less than 12 bits total.

In the example depicted in FIG. 5B, each digit is treated as an individual digit comprising four bits. In various embodiments, each one of the four bits representing each digit of the changeable digits 520 has a percentage chance it will flip upon observation of an observable moment. The percentage chance that each bit of each digit of changeable digits 520 can range from 0% to 100%. One of ordinary skill in the art will recognize that there are many schemes by which to change the digits of changeable digits 520 without deviating from the spirit or scope of the present invention. As used herein, to flip a binary bit means to change the bit from a 1 to a 0 or from a 0 to a 1. In this way, each observable moment can have a drastic and somewhat random effect on each of the digits of changeable digits 520. This drastic change can be seen in the progression from changeable digits 520 to changeable digits 530 to changeable digits 540 and all the way through to changeable digits 550.

For example at observable moment $x_1$ 525, none of the bits of the first digit flip, the three first bits of the second digit flip and the first two bits of the third digit flip. The result is a change from starting changeable digits 520 to subsequent changeable digits 530. At the next observable moment $x_2$ 535, only the third bit of the first changeable digit changes, the first three bits of the second digit flip and the last two bits of the third digit flip. One of ordinary skill in the art should recognize that the percentage chance of each bit of each digit in changeable digits 520 upon the observation of an observable moment can vary depending on the desired rate of change of changeable digits 520. The higher the chance that any particular bit will flip upon the observation of an observable moment, the more likely the particular digits of changeable digits 520 will change.

In various embodiments, the digits of a consumer identification number can be changed according to various symmetric encryption and cryptographic schemes including, but not limited to, Data Encryption Standard (DES), Elliptic Curve Cryptography (ECC), Secure Hash Algorithm 256 (SHA-256), Simple Hash and Advanced Encryption Standard (AES). In various other embodiments, each digit can be changed according to an encryption scheme or standard unique to that digit.

Figure 6A:
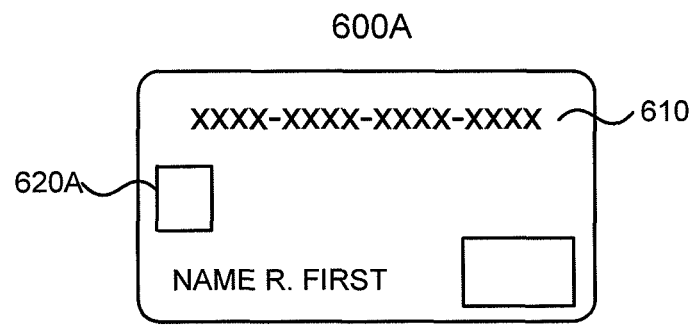
FIG. 6A depicts a portable consumer device with a light sensor according to one embodiment of the present invention.

FIG. 6A depicts a front view of portable consumer device according to one embodiment of the present invention. Portable consumer device 610 can have an environmental sensor 620A on the face of the portable consumer device. In various embodiments, environmental sensor 620A can be a temperature sensor configured to detect a change in temperature (i.e. a thermocouple or a thermometer). In various embodiments, environmental sensor 620A can be a light sensor configured to detect a pre-determined change in ambient lighting conditions. In various embodiments, environmental sensor 620A can be accelerometer configured to detect changes in acceleration. In such embodiments, the accelerometer can be configured to detect a number of steps a holder of the portable consumer device takes or each time the portable consumer device is moved after being stationary for a predetermined amount of time. In various embodiments, environmental sensor 620A can be a pressure sensor configured to detect whenever the holder of the portable consumer device changes the amount of pressure applied to the portable consumer device (i.e. sitting on a device while it is in the holder's back pocket).

Figure 6B:
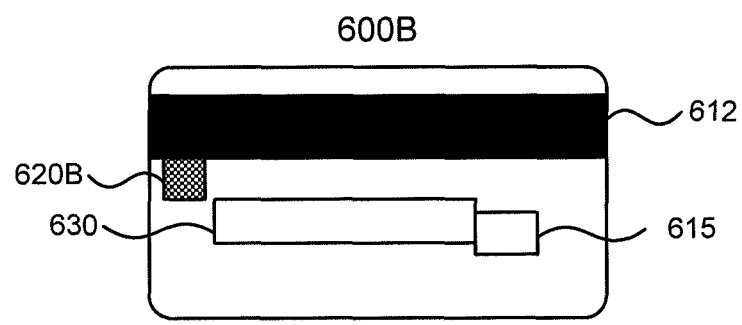
FIG. 6B depicts a portable consumer device with a sensor configured to sense each time data stored on the magnetic stripe passes a magnetic read head according to one embodiment of the present invention.

FIG. 6B depicts a back view of a portable consumer device according to one embodiment of the present invention. In various embodiments, portable consumer device 600B can have a magnetic stripe 612, a signature strip 630, additional verification information 615 and a data read/write sensor 620B. In various embodiments data read/write sensor 620B is configured to detect each time data is read from or written to magnetic stripe 612. In such embodiments data read/write sensor 620B would detect any time a portable consumer device 600B is swiped through an access device to read the data on magnetic stripe 612. This can be achieved by detecting the presence of the magnetic read head.

Figure 6C:
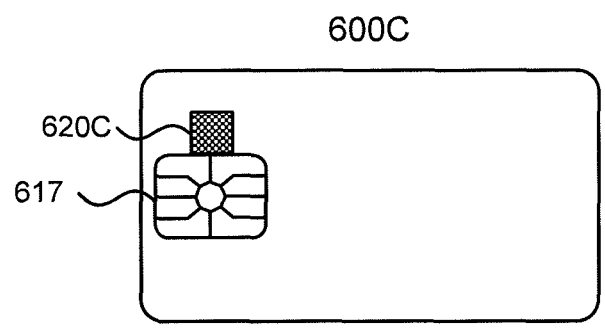
FIG. 6C depicts a portable consumer device with a sensor configured to sense each time data stored on a smart card is accessed according to one embodiment of the present invention.

FIG. 6C depicts yet another embodiment of a portable consumer device according to the present invention. In various embodiments, portable consumer device 600C has a smartcard type memory 617 and a data read/write sensor 620C configured to detect whatever data is read from or written to the smartcard type memory 617.

In various embodiments, a portable consumer device including the exemplary embodiments of portable consumer devices illustrated in portable consumer devices 600A, 600B and 600C, can include a processor, an alteration module, a memory, an antenna, a biometric reader or an input/output port. In various embodiments, the memory can contain a consumer identification number. The alteration module can contain instructions to be executed by the processor to alter the consumer identification number contained in the memory upon being triggered by an observable event. In various embodiments, the observable event will trigger a change in digits of the consumer identification number only every nth time a sensor on the portable consumer device detects an observable event (i.e. second, third, fourth, fifth observable moments etc.).

Figure 7:
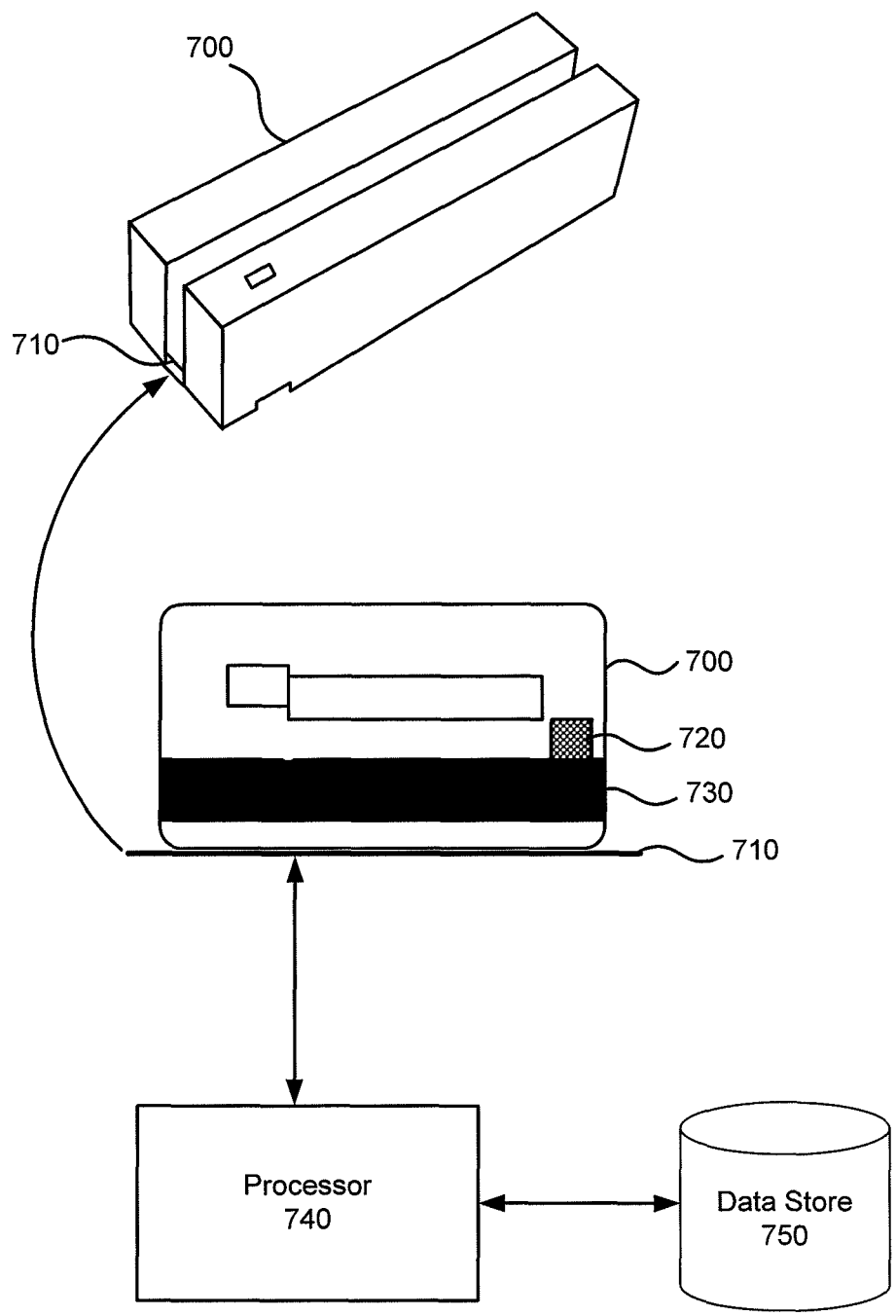
FIG. 7 depicts a system for implementing a method for encrypting a consumer identification number using a data read/write sensor according to one embodiment of the present invention.

FIG. 7 depicts a system for implementing a method for altering a consumer identification number contained in a portable consumer device according to one embodiment of the present invention. Card reader 700 can be a conventional magnetic stripe reader equipped with a magnetic stripe writer 710. In various embodiments, portable consumer device 700 has a magnetic stripe 730 containing a consumer identification number and a data read/write sensor 720. In various embodiments of the portable consumer device 700 can also have an alteration module containing alteration instructions for altering the consumer identification number contained in the magnetic stripe 730. In various embodiments, alteration instructions can be executed by the processor 740 to alter the consumer identification number contained in the magnetic stripe 730. In some embodiments, processor 740 is included in portable consumer device 700. In other embodiments, processor 740 is coupled to or a component of card reader 700.

In embodiments where processor 740 is coupled to or is a component of card reader 700, the portable consumer device 700 is swiped through card reader 700 and both the consumer identification number contained in magnetic stripe 730 and the alteration instructions contained in the alteration module can be read in sequence or simultaneously.

In various embodiments, the alteration instructions are read first and sent to the processor 740. Next the consumer identification number contained in magnetic stripe 730 is read. This read of the magnetic strip 730 is observed by sensor 720 that triggers the processor 740 to execute the instructions to alter the consumer account number. Once the consumer identification number is read, the processor 740 executes the alteration instructions and controls card writer 710 to rewrite consumer identification number onto magnetic stripe 730. In various embodiments, portable consumer device 700 may need to be swiped through card reader 700 multiple times. The first time to read the consumer identification number from magnetic stripe 730, and subsequent times to write the altered consumer identification number to magnetic stripe 730 according to the instructions contained in the alteration module.

In various embodiments, read/write sensor 720 detects each time data is written to magnetic stripe 730. In various embodiments, the read/write sensor 720 and processor 740 are configured to keep account of the number of times data has been read from or written to magnetic stripe 730. In various embodiments, the alteration instructions contained in the alteration module includes instructions to alter the consumer identification number contained in magnetic stripe 730 only after read/write sensor 720 detects a predetermined number of events. (i.e. every second, third, fourth time etc.) In various embodiments, the processor 740 can be configured to write the consumer identification number to data store 750 after it has executed the alteration instructions to alter the consumer identification number. In such embodiments data store 750 can contain the most recently saved version of the consumer identification number.

Figure 8:
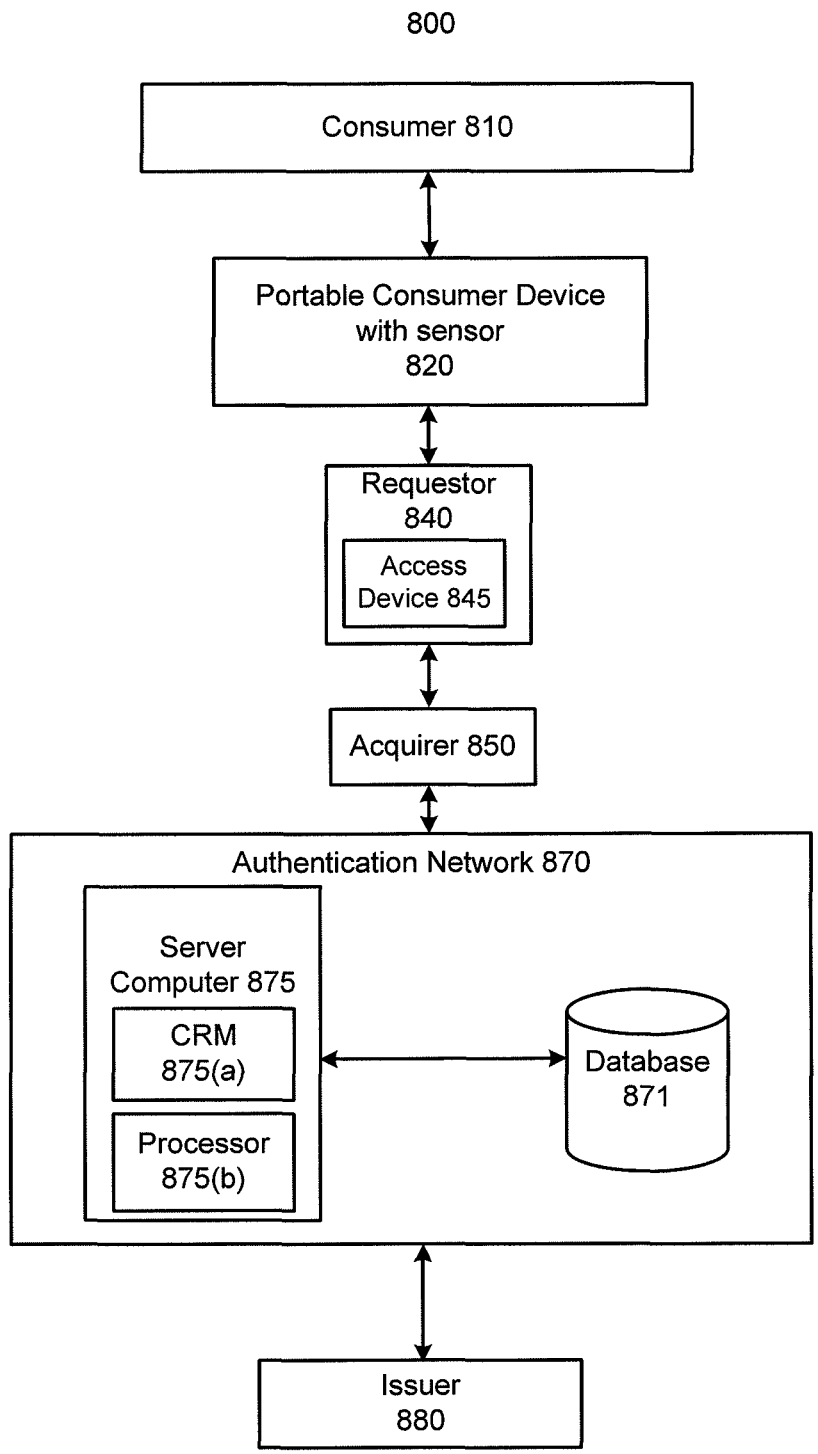
FIG. 8 depicts a system for implementing a method for authenticating a portable consumer device according to one embodiment of the present invention.

FIG. 8 is a block diagram of an exemplary system 800 according to an embodiment of the invention. Although FIG. 8 shows a number of components, the system 800 according to embodiments of the invention may comprise any suitable combination or subset of such components.

The system 800 includes a consumer 810 that uses a portable consumer device with sensor 820 (e.g. an RFID card) having a computer readable medium (not shown in FIG. 8). Specific examples of portable consumer devices are provided below.

The system 800 also includes a requestor 840 associated with an access device 845 (e.g., a point-of-sale terminal). The portable consumer device 820 can communicate with the access device 845 when an electronic authorization is conducted. The system 800 also includes an acquirer 850 (e.g., a bank) associated with the requestor 840.

The system 800 also includes an authentication network 870 having a server computer 875 in communication with a database 871. The system 800 also includes an issuer 880 that maintains an account associated with the consumer 810 and the portable consumer device with sensor 820. Some examples of issuers may be a bank, a business entity such as a retail store, or a governmental entity.

The requestor 840 can be any suitable type of entity. Some examples of requestors include a department store, a gas station, a drug store, a grocery store, a building management company, etc.

The access device 845 can be any suitable device capable of communicating with the portable consumer device with sensor 820. Examples of suitable devices include point-of-sale (POS) terminals, mobile phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, websites, and the like. Access device 845 may use any suitable contact or contactless mode of operation to communicate data to and from portable consumer device with sensor 820.

The authentication network 870 may include data processing subsystems, networks, and operations used to support and deliver authorization services, exception file services, and clearing and settlement services. An exemplary authentication network 870 may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

In FIG. 8, the authentication network 870 includes a server computer 875 which is an example of a back end computer. Although FIG. 8 shows the server computer 875 residing in the authentication network 870, it may alternatively reside at the issuer 880 in other embodiments of the invention.

A "server computer" can refer to a computer or cluster of computers. For example, the server computer 875 can be a large mainframe, a minicomputer cluster, or a group of servers functioning as a unit. In one example, the server computer 875 may be a database server coupled to a Web server (not shown). The authentication network 870 may use any suitable wired or wireless network, including the Internet.

As shown in FIG. 8, the server computer 875 has a computer readable medium (CRM) 875(a) in communication with a processor 875(b). The CRM 875(a) comprises code for performing the functions of server computer 875, while the processor 875(b) executes the code to perform the functions of server computer 875. Some examples of code stored in the CRM 875(a) include code for receiving authentication request messages, receiving consumer identification numbers the consumer 810 and the portable consumer device with sensor 820, code for analyzing the drift and histories of consumer identification numbers, code for sending authentication response messages, etc. The code stored on the CRM 875(a) could also be stored on a computer readable medium residing in the portable consumer device with sensor 820, the access device 845, or a computer at the issuer 880, as any of these devices may be used to receive consumer identification numbers or user input data and/or analyze consumer identification numbers.

The authentication network 870 also includes a database 871 in communication with the server computer 875. In some cases, the most recent consumer identification numbers and/or a history of all consumer identification numbers can be temporarily or permanently stored in the database 871.

The consumer 810 may also communicate with the server computer 875 at the authentication network 870 using a client computer (not shown), via a data network such as the Internet. The client computer may be a personal computer such as a laptop computer, phone, personal digital assistant or other device capable of processing data. It may include a standard Internet browser, and other suitable software for communication with host sites via the Internet.

One embodiment of the present invention comprises a method for using the portable consumer device 820 with a sensor and a gradually drifting consumer identification number to obtain authorization for a particular transaction. According to one embodiment of the present invention, a consumer 810 presents the portable consumer device 820 to a requestor 840. The particular transaction can comprise many different types of transactions and the few discussed herein should be considered exemplary and should in no way be viewed as limiting the present invention.

In various embodiments, the transaction that consumer 810 may want to engage in is a purchase for which he or she seeks authorization to make a payment for the purchase with a consumer payment account (e.g. credit or debit account) associated with the portable consumer device 820. In various other embodiments, the consumer 810 may want access to a controlled access area, such as a secure building or room, and is seeking authorization to enter based on the clearance or permission credentials associated with the portable consumer device 820. In various embodiments, the portable consumer device 820 is an access card that can be carried in the consumers 810 pocket or wallet or on a lanyard.

In some embodiments, presenting the portable consumer device 820 comprises inserting into or otherwise positioning the portable consumer device 820 on an access device 845 of the requestor 840 so the portable consumer device 820 can communicate with the access device 845.

After the access device 845 receives the consumer identification number from the portable consumer device 820, it sends it to an acquirer 850 and then to an authentication network 870. The consumer identification number may be embedded in an authorization request message requesting authorization for the transaction. In other embodiments, the access device 845 sends the consumer identification and/or the authorization request message directly to authentication network 870.

After the authentication network 870 receives the consumer identification number, the server computer 875(a) determines if the portable consumer device 820 is authentic, by analyzing the received consumer identification number and comparing it with previously stored consumer identification numbers in the database 871. If the portable consumer device is considered to be authentic or is not considered to be authentic, then the server computer 875 (including the computer readable medium 875(a) the processor 875(b)), can send this information to the issuer 880 so that the issuer 880 can determine whether to approve or deny the transaction. The computer readable medium 875(a) may comprise code for receiving a first consumer identification number associated with the portable consumer device, code for analyzing and comparing the first consumer identification number associated with the portable consumer device with a set of consumer identification numbers associated with the portable consumer device stored in a database. The computer readable medium 875(a) can also comprise code for analyzing the received consumer identification number against an established drift or change pattern in the set of consumer identification numbers. Additionally, computer readable medium 875(a) can also comprise code for sending an authorization response message based on whether the first consumer identification number associated with the portable consumer device complies with the established drift or change pattern or historical use patterns of the set of consumer identification numbers associated with the portable consumer device stored in the database 871.

The issuer 880 can receive the authorization request message and can determine if the transaction should be approved or denied. After it makes this decision, it can send an authorization response message back to the access device 845 via the server computer 875 in the authentication network 870 informing the requestor 840 and the consumer 810 as to whether or not the transaction is approved.

Figure 9A:
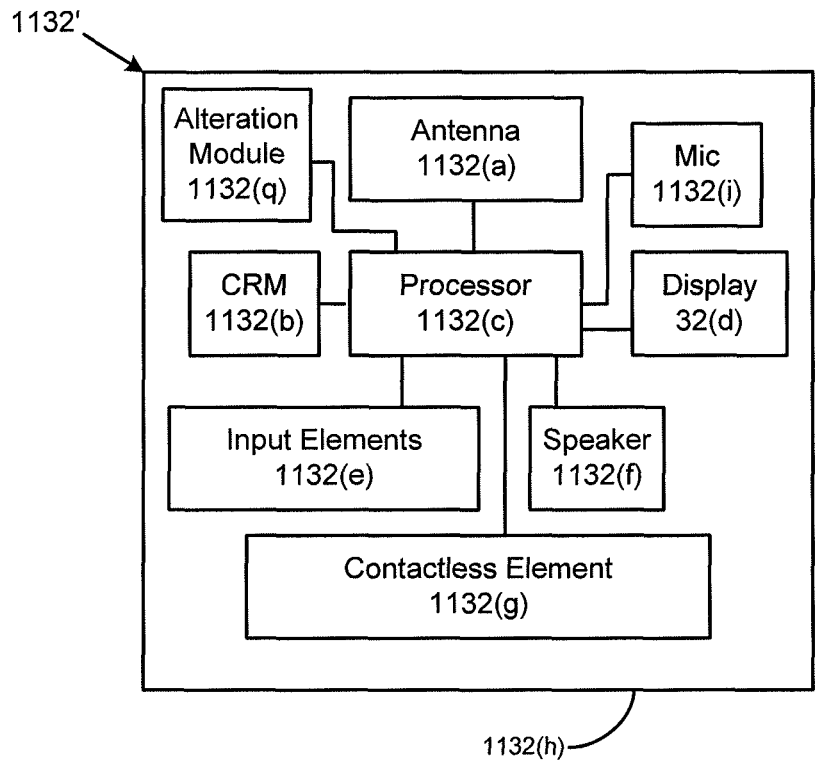
FIG. 9A depicts a schematic of a portable consumer device in the form of a mobile telephone according to one embodiment of the present invention.
Figure 9B:
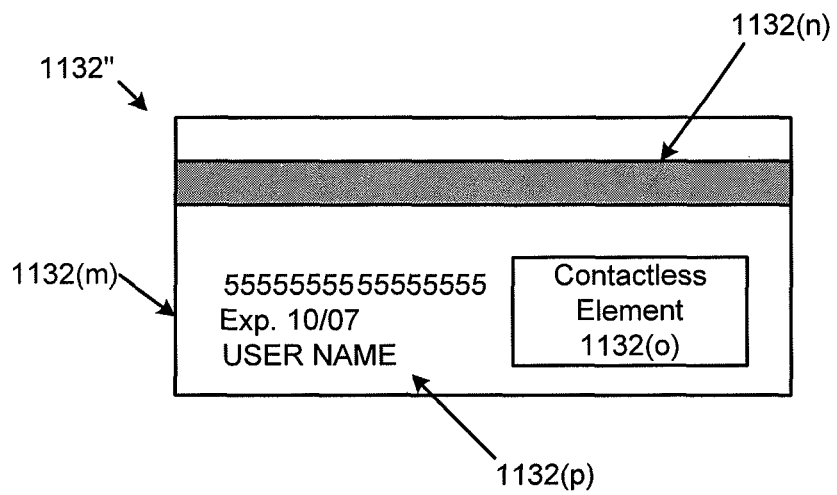
FIG. 9B depicts a portable consumer device in the form of a credit or debit card according to one embodiment of the present invention.
Figure 10:
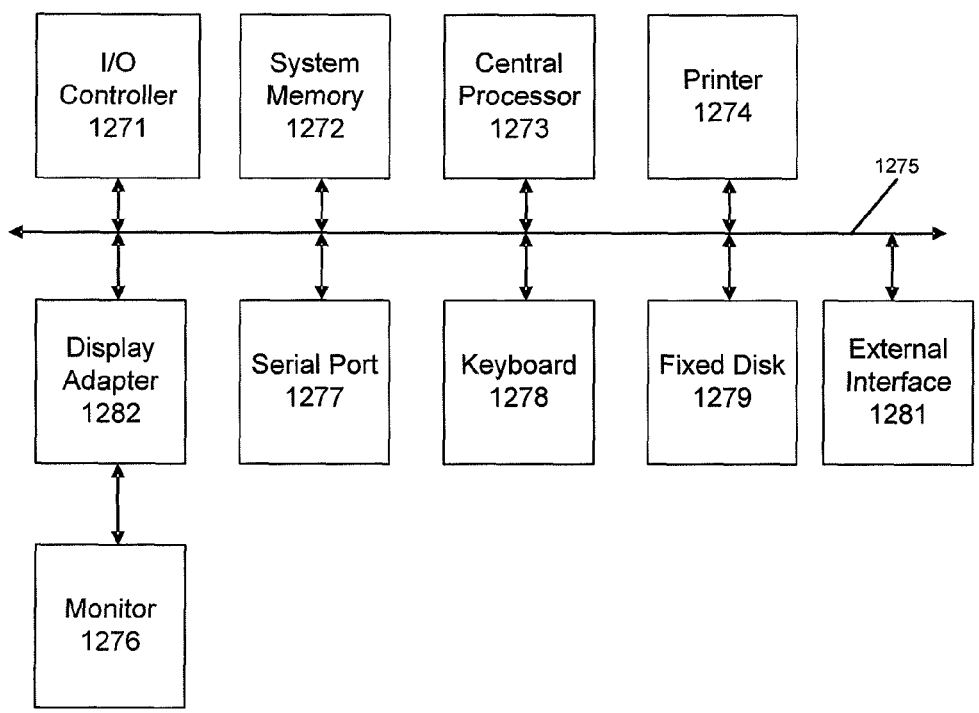
FIG. 10 depicts a system for implementing a method for authenticating a portable consumer device according to one embodiment of the present invention.

FIGS. 9A, 9B and 10 show block diagrams of portable computer devices and subsystems that may be present in computer apparatuses in systems according to embodiments of the invention.

The portable consumer device may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

An exemplary portable consumer device 1132' in the form of a phone may comprise a computer readable medium and a body as shown in FIG. 9A. (FIG. 9A shows a number of components, and the portable consumer devices according to embodiments of the invention may comprise any suitable combination or subset of such components.) The computer readable medium 1132(*b*) may be present within the body 1132(*h*), or may be detachable from it. The body 1132(*h*) may be in the form a plastic substrate, housing, or other structure. The computer readable medium 1132(*b*) may be a memory that stores data and may be in any suitable form including a magnetic stripe, a memory chip, uniquely derived keys (such as those described above), encryption algorithms, etc. For example, the memory may store code for receiving user input data; code for forming a concatenated value by concatenating the user input with a data string associated with a portable consumer device; code for deriving a user-defined key from the concatenated value; code for detecting one or more observable events; and code for altering a consumer identification number when one or more observable events are detected. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the portable consumer device 32.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The portable consumer device 1132' may further include a contactless element 1132(*g*), which is typically implemented in the form of a semiconductor chip (or other data storage element) with an associated wireless transfer (e.g., data transmission) element, such as an antenna. Contactless element 1132(*g*) is associated with (e.g., embedded within) portable consumer device 32 and data or control instructions transmitted via a cellular network may be applied to contactless element 1132(*g*) by means of a contactless element interface (not shown). The contactless element interface functions to permit the exchange of data and/or control instructions between the mobile device circuitry (and hence the cellular network) and an optional contactless element 1132(*g*).

Contactless element 1132(*g*) is capable of transferring and receiving data using a near field communications ("NEC") capability (or near field communications medium) typically in accordance with a standardized protocol or data transfer mechanism (e.g., ISO 14443/NFC). Near field communications capability is a short-range communications capability, such as RFID, Bluetooth™, infrared, or other data transfer capability that can be used to exchange data between the portable consumer device 32 and an interrogation device. Thus, the portable consumer device 32 is capable of communicating and transferring data and/or control instructions via both cellular network and near field communications capability.

The portable consumer device 1132' may also include a processor 1132(*c*) (e.g., a microprocessor) for processing the functions of the portable consumer device 1132' and a display 1132(*d*) to allow a consumer to see phone numbers and other information and messages. The portable consumer device 1132' may further include input elements 1132(*e*) to allow a consumer to input information into the device, to receive or sense external events (e.g., like the above-described sensors), a speaker 1132(*f*) to allow the consumer to hear voice communication, music, etc., and a microphone 32(*i*) to allow the consumer to transmit her voice through the portable consumer device 1132'. The portable consumer device 1132' may also include an antenna 1132(*a*) for wireless data transfer (e.g., data transmission). An alteration module 1132(*q*) may also be operatively coupled to the processor 1132(*c*). The alternation module may be embodied by a memory storing instructions for altering data in response the sensing of a stimulus external to the portable consumer device 1132'.

If the portable consumer device is in the form of a debit, credit, or smartcard, the portable consumer device 1132' may also optionally have features such as magnetic strips. Such devices can operate in either a contact or contactless mode.

An example of a portable consumer device 1132" in the form of a card is shown in FIG. 9B. FIG. 9B shows a plastic substrate 1132(*m*). A contactless element 1132(*o*) for interfacing with an access device may be present on or embedded within the plastic substrate 1132(*m*). Consumer information 1132(*p*) such as an account number, expiration date and consumer name may be printed or embossed on the card. In addition, a magnetic stripe 1132(*n*) may also be on the plastic substrate 1132(*m*).

As shown in FIG. 9B, the portable consumer device 1132" may include both a magnetic stripe 1132(*n*) and a contactless element 1132(*o*). In other embodiments, both the magnetic stripe 1132(*n*) and the contactless element 1132(*o*) may be in the portable consumer device 1132". In other embodiments, either the magnetic stripe 1132(*n*) or the contactless element 1132(*o*) may be present in the portable consumer device 1132".

The various participants and elements in FIG. 8 may operate one or more computer apparatuses to facilitate the functions described herein. Any of the elements in FIG. 8 may use any suitable number of subsystems to facilitate the functions described herein. Examples of such subsystems or components are shown in FIG. 10. The subsystems shown in FIG. 10 are interconnected via a system bus 1275. Additional subsystems such as a printer 1274, keyboard 1278, fixed disk 1279 (or other memory comprising computer readable media), monitor 1276, which is coupled to display adapter 1282, and others are shown. Peripherals and input/output (I/O) devices, which couple to I/O controller 1271, can be connected to the computer system by any number of means known in the art, such as serial port 1277. For example, serial port 1277 or external interface 1281 can be used to connect the computer apparatus to a wide area network such as the Internet, a mouse input device, or a scanner. The interconnection via system bus allows the central processor 1273 to communicate with each subsystem and to control the execution of instructions from system memory 1272 or the fixed disk 1279, as well as the exchange of information between subsystems. The system memory 1272 and/or the fixed disk 1279 may embody a computer readable medium.

A computer readable medium according to an embodiment of the invention may comprise code for performing any of the functions described above. For example, the previously described server computer 875 may comprise a computer readable medium comprising code for receiving a consumer identification number with gradually drifting digits, code for analyzing a consumer identification number with gradually drifting digits and code for sending authorization response messages.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

All patents, patent applications, publications and descriptions mentioned above are herein incorporated by reference in their entirety for all purposes. None is admitted to be prior art.

What is claimed is:

1. A method for authenticating a portable consumer device, the method comprising:
    receiving a first set of authentication data from the portable consumer device, the portable consumer device comprising a sensor configured to observe one or more events, a memory comprising the first set of authentication data, an alteration module with instructions for altering the first set of authentication data and a processer configured to execute the instructions for altering the first set of authentication data when the sensor observes the one or more events;
    comparing the first set of authentication data from the portable consumer device with a second set of authentication data;
    determining if the first set of authentication data from the portable consumer device complies with an expected change in authentication data from the second set of authentication data; and
    sending an authentication response based on whether the first set of authentication data complies with the expected change in authentication data from the second set of authentication data.

2. The method of claim 1 wherein comparing the first set of authentication data from the portable consumer device with a second set of authentication data further comprises recalling the second set of authentication data from a record of a previous authentication request in a data store.

3. The method of claim 1 wherein the expected change in authentication data from the portable device is based on a percentage chance that a plurality of bits in the second set of authentication data will change.

4. The method of claim 1 wherein determining if the first set of authentication data complies with an expected change in authentication data further comprises applying a risk analysis protocol to the first set of authentication data.

5. The method of claim 1 wherein the first set of authentication data comprises data associated with the portable consumer device.

6. The method of claim 5 wherein the first set of authentication data is stored as a new baseline authentication data if the first set of authentication data has changed to a degree that it cannot be determined if it complies with the expected change in authentication data and if the first set of authentication data can be validated by a risk analysis protocol.

* * * * *